(12) United States Patent
Lee et al.

(10) Patent No.: US 8,860,914 B2
(45) Date of Patent: Oct. 14, 2014

(54) DISPLAY DEVICE AND METHOD OF MANUFACTURING THE SAME

(75) Inventors: Jae-Young Lee, Yongin (KR); Ju-Yeon Seo, Yongin (KR); Seong-Jun Lee, Yongin (KR); Yi Li, Yongin (KR); Seong-Ryong Lee, Yongin (KR); Yong-Kyu Jang, Yongin (KR)

(73) Assignee: Samsung Display Co., Ltd., Giheung-Gu, Yongin, Gyeonggi-Do (KR)

( * ) Notice: Subject to any disclaimer, the term of this patent is extended or adjusted under 35 U.S.C. 154(b) by 232 days.

(21) Appl. No.: 13/043,034

(22) Filed: Mar. 8, 2011

(65) Prior Publication Data

US 2011/0222010 A1 Sep. 15, 2011

(30) Foreign Application Priority Data

Mar. 11, 2010 (KR) .................. 10-2010-0021839

(51) Int. Cl.
*G02F 1/1337* (2006.01)
*G02F 1/1343* (2006.01)

(52) U.S. Cl.
CPC .............. *G02F 1/134336* (2013.01); *G02F 2001/133726* (2013.01); *G02F 1/133788* (2013.01); *G02F 2001/133776* (2013.01)
USPC .............. 349/129; 349/38; 349/139

(58) Field of Classification Search
USPC .............. 349/129, 139, 130, 143, 38–39
See application file for complete search history.

(56) References Cited

U.S. PATENT DOCUMENTS

| | | | |
|---|---|---|---|
| 5,953,091 A * | 9/1999 | Jones et al. ................... | 349/129 |
| 5,998,101 A | 12/1999 | Park et al. | |
| 6,201,588 B1 | 3/2001 | Walton et al. | |
| 6,407,791 B1 | 6/2002 | Suzuki et al. | |
| 6,992,329 B2 * | 1/2006 | Wu et al. ................... | 349/129 |
| 7,209,205 B2 * | 4/2007 | Yoshida et al. ................ | 349/129 |
| 8,310,637 B2 * | 11/2012 | Moon et al. ................... | 349/129 |

(Continued)

FOREIGN PATENT DOCUMENTS

| | | |
|---|---|---|
| JP | 2000-292783 | 10/2000 |
| JP | 2005-043698 | 2/2005 |

(Continued)

OTHER PUBLICATIONS

Korean Office Action issued by Korean Patent Office on Jun. 22, 2011, corresponding to Korean Patent Application No. 10-2010-0021839 and Request for Entry of the Accompanying Office Action attached herewith.

(Continued)

*Primary Examiner* — Dung Nguyen
(74) *Attorney, Agent, or Firm* — Robert E. Bushnell, Esq.

(57) ABSTRACT

A display device having an improved viewing angle by using a linear polarization structure, and a method of manufacturing the same. The display device includes a first substrate arrangement including a domain forming layer and a pixel electrode arranged on the domain forming layer, the pixel electrode having a cross type opening pattern, a second substrate arrangement including a common electrode arranged on an entire surface that faces the first substrate arrangement and a liquid crystal layer arranged between the first substrate arrangement and the second substrate arrangement, the liquid crystal layer including a plurality of liquid crystal molecules and a reactive mesogen to fix liquid crystal molecules and to produce a liquid crystal domain based on the cross type opening pattern.

19 Claims, 5 Drawing Sheets

(56) References Cited

U.S. PATENT DOCUMENTS

| | | |
|---|---|---|
| 2003/0156237 A1* | 8/2003 | Lin et al. ............... 349/110 |
| 2005/0001964 A1* | 1/2005 | Kubo et al. ............. 349/129 |
| 2006/0066799 A1 | 3/2006 | Mizusako et al. |
| 2007/0195246 A1 | 8/2007 | Huang |
| 2008/0278675 A1 | 11/2008 | Escuti et al. |
| 2009/0284700 A1 | 11/2009 | Kim et al. |
| 2010/0053526 A1 | 3/2010 | Kye et al. |
| 2010/0149448 A1* | 6/2010 | Kim ........................ 349/42 |
| 2011/0261278 A1* | 10/2011 | Oh et al. ................. 349/123 |
| 2013/0063686 A1* | 3/2013 | Tashiro et al. .......... 349/98 |

FOREIGN PATENT DOCUMENTS

| | | |
|---|---|---|
| KR | 1020010007523 A | 1/2001 |
| KR | 1020060051790 A | 5/2006 |
| KR | 1020090119059 A | 11/2009 |
| WO | 2006/050793 A1 | 5/2006 |

OTHER PUBLICATIONS

Korean Office Action issued by Korean Patent Office on Feb. 28, 2012 in connection with Korean Patent Application No. 10-2010-0021839 and Request for Entry attached herewith.

Fujitsu Science Technology journal. vol. 35, 2, pp. 221-228 (Dec. 1999) titled Super High Quality MVA-TFT Liquid Crystal Displays by Koike.

* cited by examiner

DISPLAY DEVICE AND METHOD OF MANUFACTURING THE SAME

CLAIM OF PRIORITY

This application makes reference to, incorporates the same herein, and claims all benefits accruing under 35 U.S.C. §119 from an application earlier filed in the Korean Intellectual Property Office on the 11 Mar. 2010 and there duly assigned Serial No. 10-2010-0021839.

BACKGROUND OF THE INVENTION

1. Field of the Invention

The present invention relates to a liquid crystal display device that displays an image by using liquid crystals, and a method of manufacturing the liquid crystal display device.

2. Description of the Related Art

Generally, a liquid crystal display panel includes an array substrate on which switching devices for driving each pixel region are formed, a counter substrate facing the array substrate, and a liquid crystal layer disposed between the array substrate and the counter substrate. The liquid crystal display panel displays an image by controlling transmittance of light via a voltage applied to the liquid crystal layer.

Meanwhile, in a patterned vertical alignment (PVA) mode, i.e., a VA mode of operation for a liquid crystal display device, a viewing angle of the liquid crystal display device may be improved by forming a liquid crystal domain by arranging liquid crystal molecules in different directions by using a patterned transparent electrode.

SUMMARY OF THE INVENTION

The present invention provides a display device having an improved viewing angle by using a linear polarization structure, and a method of manufacturing the display device.

According to an aspect of the present invention, a display device includes a first substrate arrangement including a domain forming layer and a pixel electrode arranged on the domain forming layer, the pixel electrode having a cross type opening pattern, a second substrate arrangement including a common electrode arranged on an entire surface that faces the first substrate arrangement and a liquid crystal layer arranged between the first substrate arrangement and the second substrate arrangement, the liquid crystal layer including a plurality of liquid crystal molecules and a reactive mesogen to fix liquid crystal molecules and to produce a liquid crystal domain based on the cross type opening pattern.

The first substrate arrangement may include a bottom electrode arranged within a pixel region and a storage line in direct contact with an end of the bottom electrode. The bottom electrode may include a transparent electrode material. The first substrate arrangement may further include a switching device that includes a contact electrode electrically connected to the pixel electrode, and the domain forming layer may further include a contact hole to expose the contact electrode and to allow the pixel electrode to contact the contact electrode. The cross type opening pattern may be arranged to divide the pixel region into four equal parts. The liquid crystal layer may be arranged to face a center of the cross type opening pattern. The liquid crystal layer may be arranged to linearly polarize light emitted from the display device.

According to another aspect of the present invention, there is provided a method of manufacturing a display device that includes preparing a first substrate comprising a pixel electrode having a cross type opening pattern for forming a liquid crystal domain in a pixel region, preparing a second substrate comprising a common electrode formed on the entire surface facing the first substrate and forming a liquid crystal layer by irradiating light on liquid crystal molecules and reactive mesogen monomers disposed between the first and second substrates, while applying a voltage between the pixel electrode and the common electrode. The preparing of the first substrate may include forming a bottom electrode in a pixel region on a first base substrate, forming an organic layer on the bottom electrode and forming the pixel electrode on the organic layer.

The forming of the liquid crystal layer may include applying a first voltage to the common electrode, applying a second voltage and higher voltage to the bottom electrode, applying a third voltage to the pixel electrode, the third voltage being greater than the first voltage and less than the second voltage and irradiating light on the first and second substrates. The preparing of the first substrate may include forming a storage line that directly contacts the bottom electrode, wherein a voltage is applied to the bottom electrode via the storage line. The liquid crystal layer may be arranged to face a center of the cross type opening pattern. The liquid crystal layer may be arranged to linearly polarize light emitted from the display device.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference symbols indicate the same or similar components, wherein.

DETAILED DESCRIPTION OF THE INVENTION

Figure 1:
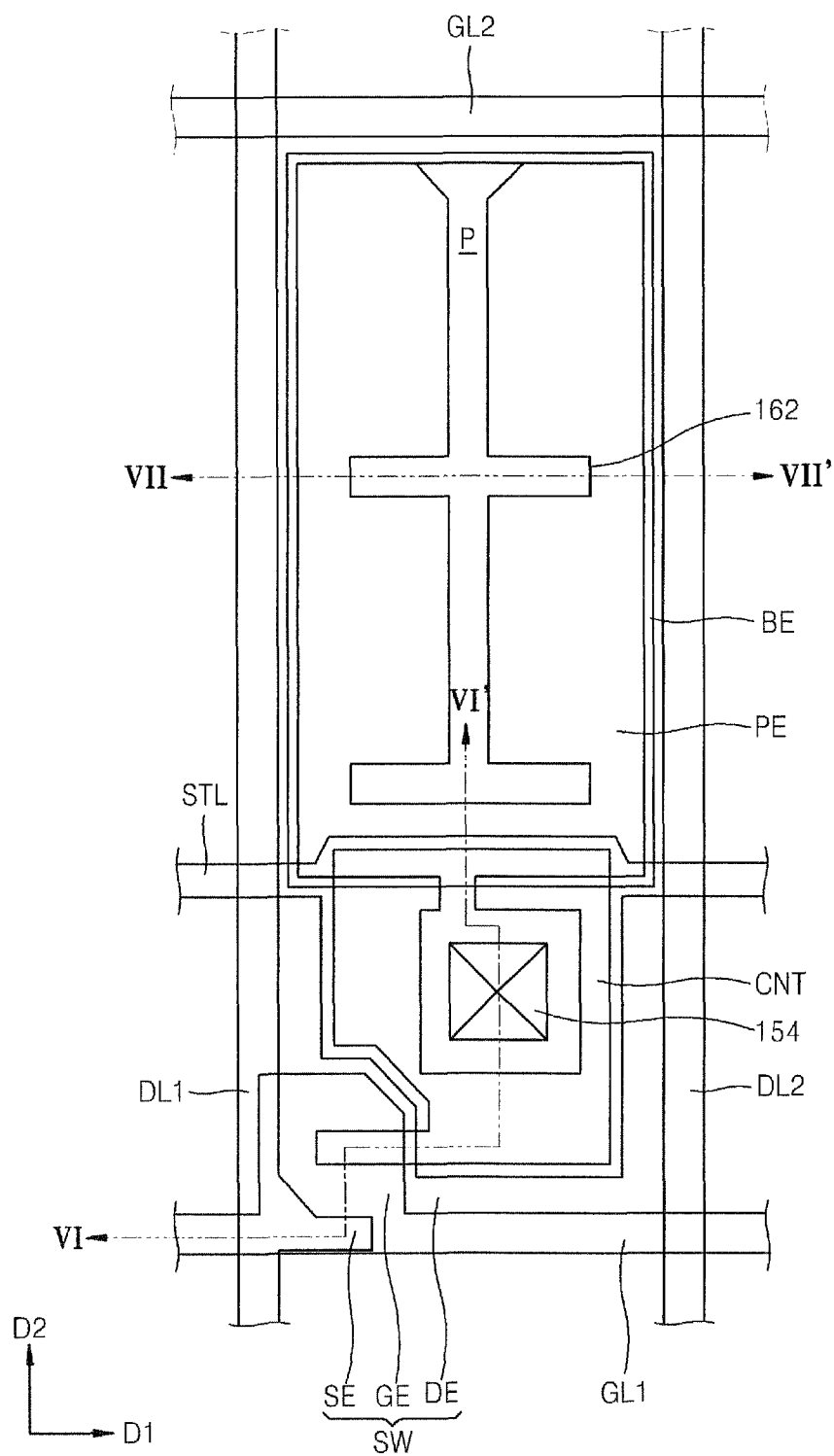
FIG. 1 is a plan view of a display device according to an embodiment of the present invention.

Hereinafter, the present invention will be described more fully with reference to the accompanying drawings, in which exemplary embodiments of the invention are shown. FIG. 1 is a plan view of a display device according to an embodiment of the present invention, FIG. 2A is a cross-sectional view taken along a line VI-VI' of FIG. 1, and FIG. 2B is a cross-sectional view taken along a line VII-VII' of FIG. 1.

Figure 2A:
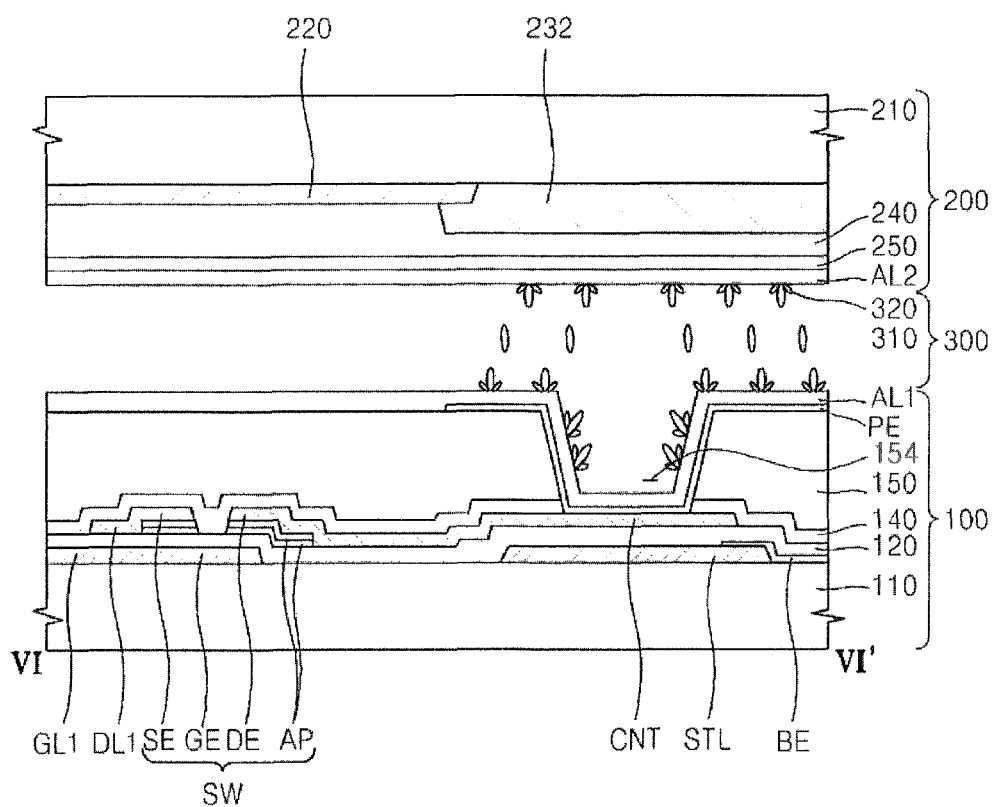
FIG. 2A is a cross-sectional view taken along a line VI-VI' of FIG. 1.
Figure 2B:
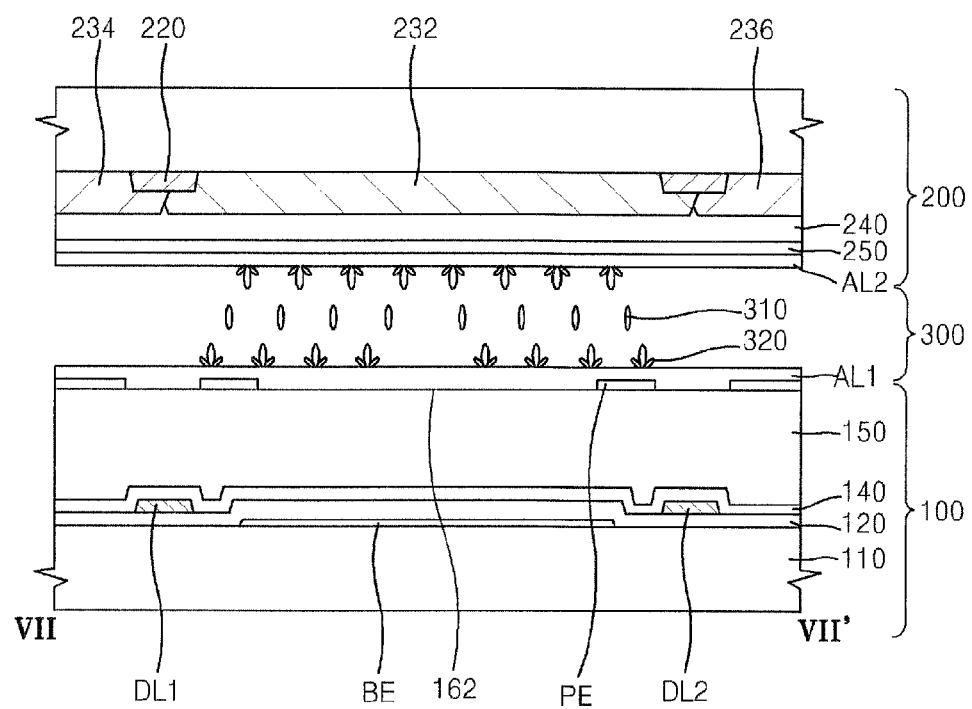
FIG. 2B is a cross-sectional view taken along a line VII-VII' of FIG. 1.

Liquid crystal layers 300 in FIGS. 2A and 2B include liquid crystal molecules 310 and a reactive mesogen (RM) cured product 320 in a non-electric field, i.e., when no voltage is applied between a pixel electrode PE and a common electrode 250.

Referring to FIGS. 1, 2A, and 2B, the display device according to the current embodiment of the present invention includes a first substrate arrangement 100, a second substrate arrangement 200, and the liquid crystal layer 300. The first substrate arrangement 100 includes a first base substrate 110, first and second gate lines GL1 and GL2, a storage line STL, a bottom electrode BE, a gate insulation layer 120, first and second data lines DL1 and DL2, a thin film transistor SW constituting a switching device, a passivation layer 140, a domain forming layer 150, the pixel electrode PE, and a first alignment layer AL1.

The first and second gate lines GL1 and GL2 may extend along a first direction D1 on the first base substrate 110. Instead, the first and second gate lines GL1 and GL2 may be arranged in parallel to each other in a second direction D2 different from the first direction D1. The second direction D2 may be, for example, perpendicular to the first direction D1.

The storage line STL is disposed between the first and second gate lines GL1 and GL2, and may extend along the first direction D1. The bottom electrode BE directly contacts one end of the storage line STL, and is formed in a pixel region P of the first base substrate 110.

The gate insulation layer 120 is formed on the first base substrate 110 to cover the first and second gate lines GL1 and GL2, the storage line STL, and the bottom electrode BE.

The first and second data lines DL1 and DL2 may extend along the second direction D2 on the gate insulation layer 120, and may instead be arranged in parallel to each other in the first direction D1. The first and second data lines DL1 and DL2 may respectively cross the first and second gate lines GL1 and GL2 and the storage line STL.

The thin film transistor SW may include a gate electrode GE connected to the first gate line GL1, an active pattern AP formed on the gate insulation layer 120 so as to correspond to the gate electrode GE, a source electrode SE connected to the first data line DL1 and overlapping the active pattern AP, a drain electrode DE spaced apart from the source electrode SE and overlapping the active pattern AP, and a contact electrode CNT extending from the drain electrode DE to the pixel region P. The contact electrode CNT may extend from the drain electrode DE to overlap a part of the storage line STL. The contact electrode CNT may have a large area and be arranged adjacent to the first gate line GL1. The passivation layer 140 may be disposed on the gate insulation layer 120 to cover the first and second data lines DL1 and DL2, the source electrode SE, the drain electrode DE, and the contact electrode CNT.

The domain forming layer 150 may be formed on the passivation layer 140. The domain forming layer 150 may planarize the first substrate arrangement 100. The domain forming layer 150 includes a contact hole 154 for exposing the contact electrode CNT. The pixel electrode PE formed on the domain forming layer 150 contacts the contact electrode CNT through the contact hole 154, and thus the pixel electrode PE may be electrically connected to the thin film transistor SW.

The pixel electrode PE is disposed on the domain forming layer 150 in the pixel region P. The pixel electrode PE may be made out of a transparent conductive material. The pixel electrode PE includes a cross type opening pattern 162 formed in the pixel region P. The liquid crystal modules 310 of the liquid crystal layer 300 may be gathered and arranged toward one point of the second substrate arrangement 200 corresponding to an area where the cross type opening pattern 162 is formed. Accordingly, the cross type opening pattern 162 may form a liquid crystal domain of the pixel region P. Also, a direction of an electric field is bent between the common electrode 250 and an end of another pixel electrode adjacent to the pixel electrode PE. Accordingly, a liquid crystal domain between adjacent pixel regions P may be divided by arranging the liquid crystal molecules 310 to emit light toward different points of the common electrode 250 between the adjacent pixel electrodes PE. This will be described in detail later.

The first alignment layer AL1 may be formed on the entire surface of the first base substrate 110 including the pixel electrode PE.

The second substrate arrangement 200 includes a second base substrate 210, a black matrix pattern 220 formed on the second base substrate 210, first through third color filters 232, 234, and 236, an over coating layer 240, the common electrode 250, and a second alignment layer AL2. The second substrate arrangement 200 may omit the over coating layer 240.

The black matrix pattern 220 may be formed on the second base substrate 210 corresponding to areas where the first and second gate lines GL1 and GL2, the first and second data lines DL1 and DL2, and the thin film transistor SW are formed. The first through third color filters 232, 234, and 236 may be formed in areas of the second base substrate 210 defined by the black matrix pattern 220. For example, the first color filter 232 may be formed on an area of the second base substrate 210 corresponding to the pixel region P in which the pixel electrode PE is formed. The second color filter 234 may be formed in the first direction D1 from the first color filter 232, and the third color filter 236 may be formed in a direction opposite the first direction D1 on the other side of the first color filter 232. The over coating layer 240 is formed on the second base substrate 210 where the black matrix pattern 220 and the first through third color filters 232, 234, and 236 are formed, and may planarize the second substrate arrangement 200.

The common electrode 250 may be formed on the over coating layer 240. The common electrode 250 may be made out of a transparent conductive material. The common electrode 250 may be formed on the entire surface of the second substrate arrangement 200 without a separate pattern. In other words, the liquid crystal domain of the liquid crystal layer 300 may be formed by the pixel electrode PE that changes an intensity of an electric field due to the cross type opening pattern 162, and the common electrode 250 that has no pattern. The second alignment layer AL2 is formed on the second base substrate 210 on which the common electrode 250 is formed, and may be formed on the entire surface of the second substrate arrangement 200.

The liquid crystal layer 300 is disposed between the first substrate arrangement 100 and the second substrate arrangement 200, and includes the liquid crystal molecules 310 and the RM cured product 320. The alignment of the liquid crystal molecules 310 is changed by an electric field formed between the pixel electrode PE and the common electrode 250, thereby adjusting transmittance of light. The liquid crystal molecules 310 may have negative dielectric anisotropy.

A major axis of the liquid crystal molecules 310 adjacent to the first substrate arrangement 100 and/or the second substrate arrangement 200 may be arranged perpendicular to the surface of the first base substrate 110 and/or the second base substrate 210 when no voltage is applied between the pixel electrode PE and the common electrode 250.

The RM cured product 320 may be disposed between the liquid crystal molecules 310. The RM cured product 320 may be disposed between the liquid crystal molecules 310 adjacent to the pixel electrode PE and/or the common electrode 250. In detail, the RM cured product 320 may be disposed between the liquid crystal molecules 310 adjacent to the first alignment layer AL1. Also, the RM cured product 320 may be disposed between the liquid crystal molecules 310 adjacent to the second alignment layer AL2.

The RM cured product 320 maintains the liquid crystal molecules 310 adjacent to the first substrate arrangement 100 and/or the second substrate arrangement 200 in a pre-tilt state based on the surface of the first base substrate 110 and/or the second base substrate 210, even when an electric field is not formed between the pixel electrode PE and the common electrode 250. The RM cured product 320 may be formed when RM monomers (not shown) are polymerized by an external light when the display device is manufactured.

Methods of preparing the first substrate arrangement 100 and the second substrate arrangement 200 according to embodiments of the present invention will now be described with reference to FIGS. 2A and 2B.

Referring to FIGS. 2A and 2B, a gate metal layer (not shown) is disposed on the first base substrate 110, and the gate metal layer may be patterned to form a gate pattern including the first and second gate lines GL1 and GL2, the gate electrode GE, and the storage line STL.

A transparent electrode layer (not shown) is disposed on the first base substrate 110 including the gate pattern, and then the transparent electrode layer is patterned to form the bottom electrode BE directly contacting one end of the storage line STL. The bottom electrode BE may directly contact the first base substrate 110 in the pixel region P.

The gate insulation layer 120 is disposed on the first base substrate 110 on which the gate pattern and the bottom electrode BE are formed. The gate insulation layer 120 may be made out of silicon oxide, silicon nitride, or the like.

The active pattern AP is formed on the first base substrate 110 where the gate insulation layer 120 is formed, and a source metal layer (not shown) is disposed on the first base substrate 110 including the active pattern AP. The source metal layer is patterned to form a source pattern including the first and second data lines DL1 and DL2, the source electrode SE, the drain electrode DE, and the contact electrode CNT.

The passivation layer 140 and the domain forming layer 150 are sequentially formed on the first base substrate 110 on which the source pattern is formed. The passivation layer 140 may be made out of silicon oxide or silicon nitride. Examples of a material used to form the domain forming layer 150 include organic materials such as a positive type photoresist composition and a negative type photoresist composition, and inorganic materials such as silicon oxide and silicon nitride. The domain forming layer may include a color filter.

Next, a transparent electrode layer (not shown) is disposed on the first base substrate 110 including the domain forming layer 150, and the transparent electrode layer is patterned to form the pixel electrode PE. The transparent electrode layer may be made out of indium tin oxide (ITO), indium zinc oxide (IZO), or the like.

Then, the first alignment layer AL1 is disposed on the first base substrate 110 on which the pixel electrode PE is formed. The first alignment layer AL1 may include a vertical alignment material that vertically aligns the liquid crystal molecules 310.

As above, the first substrate arrangement 100 according to the current embodiment of the present invention, including the gate pattern, the gate insulation layer 120, the active pattern AP, the source pattern, the passivation layer 140, the domain forming layer 150, the pixel electrode PE, and the first alignment layer ALL may be prepared.

Then, the second substrate arrangement 200 facing the first substrate arrangement 100 is prepared, and the liquid crystal layer 300 is disposed between the first substrate arrangement 100 and the second substrate arrangement 200, thereby manufacturing the display device according to the current embodiment of the present invention.

In detail, the black matrix pattern 220 is formed on the second base substrate 210. The black matrix pattern 220 may be formed by ejecting an organic ink or patterning a metal layer through a photolithography process.

The first through third color filters 232, 234, and 236 are formed on the second base substrate 210 on which the black matrix pattern 220 is formed. For example, the first color filter 232 may be formed, the second color filter 234 may be formed on the second base substrate 210 including the first color filter 232, and the third color filter 236 may be formed on the second base substrate 210 including the first and second color filters 232 and 234. The first through third color filters 232, 234, and 236 may be formed by patterning a color photoresist layer through a photolithography process or by ejection of a color ink.

The over coating layer 240 may be disposed on the second base substrate 210 including the black matrix pattern 220 and the first through third color filters 232, 234, and 236. The over coating layer 240 may be made out of acryl resin.

A transparent electrode layer (not shown) may be formed on the second base substrate 210 on which the over coating layer 240 is formed, thereby forming the common electrode 250. The common electrode 250 may be formed to cover the entire surface of the second base substrate 210 without having to pattern the transparent electrode layer. The common electrode 250 may be made out of ITO or IZO.

The second alignment layer AL2 may be disposed on the second base substrate 210 on which the common electrode 250 is formed. The second alignment layer AL2 may cover the entire surface of the second base substrate 210 on which the common electrode 250 is formed.

Accordingly, the second substrate arrangement 200 according to the current embodiment of the present invention, including the black matrix pattern 220, the first through third color filters 232, 234, and 236, the over coating layer 240, the common electrode 250, and the second alignment layer AL2, may be prepared.

Figure 3:
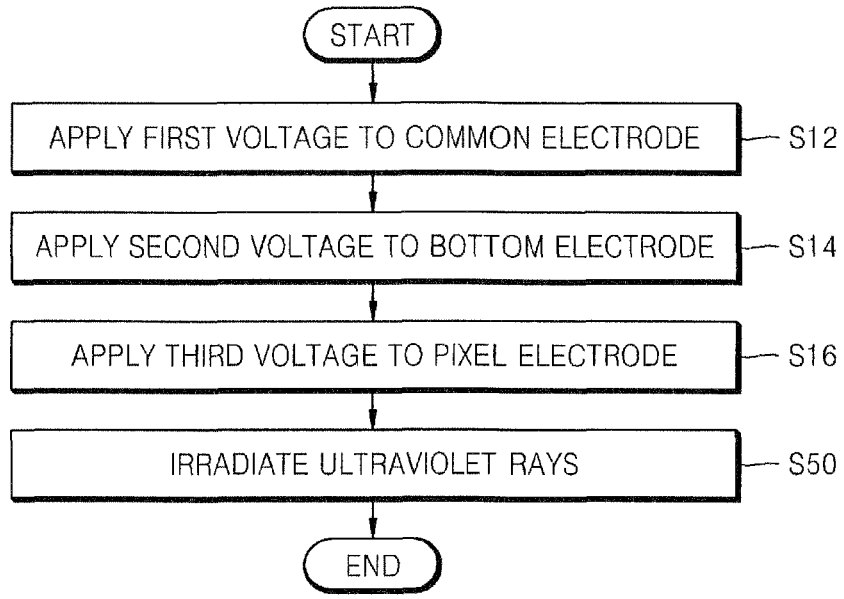
FIG. 3 is a flowchart illustrating a method of manufacturing the display device of FIG. 2B, according to an embodiment of the present invention.

A method of forming the liquid crystal layer 300 according to an embodiment of the present invention will now be described with reference FIG. 3. FIG. 3 is a flowchart illustrating a method of manufacturing the display device of FIG. 2B according to an embodiment of the present invention. Referring to FIGS. 2B and 3, the first and second substrate arrangements 100 and 200 are assembled, and a liquid crystal composition is disposed between the first and second substrate arrangements 100 and 200. The liquid crystal composition may include the liquid crystal modules 310 and the RM monomers.

When the liquid crystal composition is disposed between the first and second substrate arrangements 100 and 200, a first voltage Vcom is applied to the common electrode 250 in operation S12, and a second voltage Vb1 is applied to the bottom electrode BE in operation S14.

The first voltage Vcom may be, for example, about 0V. The second voltage Vb1 is higher than the first voltage Vcom. The second voltage Vb1 may be, for example, from about 7V to about 16 V. The second voltage Vb1 may be provided to the bottom electrode BE through the storage line STL. An electric field is formed between the first and second substrate arrangements 100 and 200 by the first and second voltages Vcom and Vb1. The major axis of the liquid crystal molecules 310 may be arranged perpendicular to a direction of the electric field formed by the first and second voltages Vcom and Vb1.

Then, a third voltage Vdata is applied to the pixel electrode PE in operation S16. The third voltage Vdata is higher than the first voltage Vcom and lower than the second voltage Vb1, and may be a positive or negative voltage. The third voltage Vdata may be, for example, about 5 V.

Next, the first and second substrate arrangements 100 and 200 are irradiated with ultraviolet (UV) rays while the liquid crystal molecules 310 are pre-tilted by the first through third voltages Vcom, Vb1, and Vdata, in operation S50. The RM monomers are polymerized through a photoreaction with the UV rays. Accordingly, the polymerized cured product 320 of FIG. 2B is formed, and the liquid crystal molecules 310 may be fixed adjacent to the pixel electrode PE and/or the common electrode 250 while being pre-tilted by the RM cured product 320.

As such, the liquid crystal molecules 310 disposed in an area adjacent to the cross type opening pattern 162 may be stably arranged by using a stronger electric field by supplying the second voltage Vb1, which is higher than the third voltage Vdata applied on the pixel electrode PE, to the bottom electrode BE formed below the pixel electrode PE. Thus, the liquid crystal layer 300 according to the current embodiment of the present invention is formed.

Figure 5:
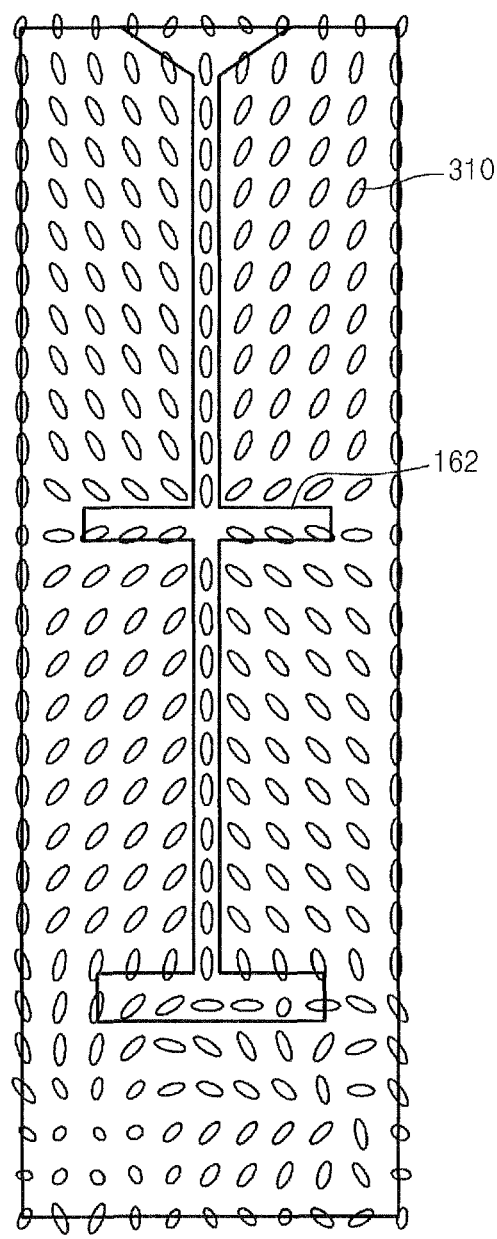
FIG. 5 is a diagram showing a shape of a liquid crystal layer of the display device manufactured according to the methods of FIGS. 3 and 4.

FIG. 5 is a diagram showing a shape of the liquid crystal layer 300 of the display device manufactured according to the method of FIG. 3. As described above, a cross pattern is formed on the pixel electrode PE and then a high voltage is applied to the bottom electrode BE, thereby arranging the liquid crystal molecules 310 in the shape shown in FIG. 5. In addition, since a linear polarization structure is possible by controlling an arrangement angle and direction of the liquid crystal molecules 310, a viewing angle of the display device may be improved.

According to the current embodiment of the present invention, an aperture ratio of the pixel region P may be improved, and the viewing angle of the display device may be improved. Also, reliability of manufacturing processes of the display device may be improved, and productivity of the display device may be improved by simplifying the manufacturing processes.

A display device and a method of manufacturing the display device, according to other embodiments of the present invention will now be described. The display device according to the current embodiment of the present invention is substantially identical to the display device of FIGS. 1, 2A, and 2B. Accordingly, the same descriptions are not repeated.

The method of manufacturing the display device according to the current embodiment of the present invention will now be described with reference to FIGS. 2A, 2B, and 4. Processes of preparing the first and second substrate arrangements 100 and 200 according to the current embodiment of the present invention are substantially identical to those described in the previous embodiment. Accordingly, overlapping descriptions will not be repeated.

Figure 4:
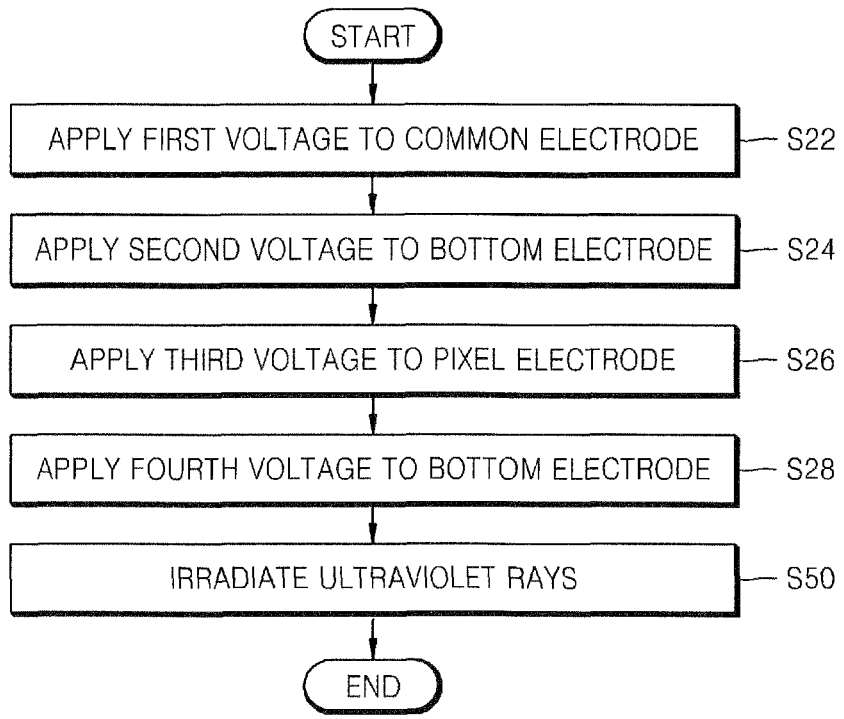
FIG. 4 is a flowchart illustrating a method of manufacturing a display device of FIG. 2B, according to another embodiment of the present invention.

Referring to FIGS. 2A, 2B, and 4, the first and second substrate arrangements 100 and 200 are individually prepared, and then are assembled. A liquid crystal composition is disposed between the first and second substrate arrangements 100 and 200. The liquid crystal composition may include the liquid crystal molecules 310 and the RM monomers.

Referring to FIG. 4, when the liquid crystal composition is disposed between the first and second substrate arrangements 100 and 200, the first voltage Vcom is applied to the common electrode 250 in operation S22 and the second voltage Vb1 is applied to the bottom electrode BE in operation S24. The second voltage Vb1 is higher than the first voltage Vcom. The second voltage Vb1 may be applied to the bottom electrode BE through the storage line STL.

An electric field is formed between the first and second substrate arrangements 100 and 200 by the first and second voltages Vcom and Vb1. The major axis of the liquid crystal molecules 310 may be arranged in a direction perpendicular to a direction of the electric field formed by the first and second voltages Vcom and Vb1.

Then, the third voltage Vdata is applied to the pixel electrode PE in operation S26. The third voltage Vdata is higher than the first voltage Vcom and lower than the second voltage Vb1. Since a strong electric field is formed in an area near the cross type opening pattern 162 by the first and second voltages Vcom and Vb1, an arrangement of the liquid crystal molecules 310 in the area near the cross type opening pattern 162 is similar to an arrangement when the second voltage Vb1 is applied, even when the third voltage Vdata is being applied to the pixel electrode PE. The first through third voltages Vcom, Vb1 and Vdata may each be a positive voltage or each be negative voltage, and may be a direct current (DC) or alternating current (AC) voltage.

Next, a fourth voltage Vb2 is applied on the bottom electrode BE in operation S28. The fourth voltage Vb2 is higher than the first through third voltages Vcom, Vb1 and Vdata. The fourth voltage Vb2 may be, for example, about 25 V. Accordingly, the strongest electric field is formed between the common electrode 250 and the bottom electrode BE when the fourth voltage Vb2 is applied, and the major axis of the liquid crystal molecules 310 may be arranged perpendicular to a direction of an electric field formed by the first through fourth voltages Vcom, Vb1, Vdata, and Vb2.

UV rays are irradiated on the first and second substrate arrangements 100 and 200 in operation S50, while the liquid crystal molecules 310 are pre-tilted by the first through fourth voltages Vcom, Vb1, Vdata, and Vb2. The RM monomers are polymerized through a photoreaction with the UV rays. Accordingly, the RM cured product 320 of FIG. 2B is formed, and the liquid crystal molecules 310 may be fixed adjacent to the pixel electrode PE and/or the common electrode 250 while being pre-tilted by the RM cured product 320.

As such, the liquid crystal molecules 310 arranged in an area near the cross type opening pattern 162 may be stably arranged by a stronger electric field, by providing the second voltage Vb1 and the fourth voltage Vb2, which are higher than the third voltage Vdata applied on the pixel electrode PE, to the bottom electrode BE formed below the pixel electrode PE. Specifically, by applying the second voltage Vb1 higher than the third voltage Vdata and lower than the fourth voltage Vb2 before applying the fourth voltage Vb2, which has the highest level from among the first through fourth voltages Vcom, Vb1, Vdata, and Vb2, to the bottom electrode BE, the movement of the liquid crystal molecules 310 may be prevented from remarkably changing. Accordingly, the liquid crystal molecules 310 arranged in the area near the cross type opening pattern 162 may be stably arranged by using a stronger electric field. As such, the liquid crystal layer 300 according to the current embodiment of the present invention is formed.

Although not illustrated in FIG. 4, the method may further include irradiating UV rays on the first and second substrate arrangements 100 and 200 before applying the fourth voltage Vb2 to the bottom electrode BE. The RM monomers are partially reacted and hardened by irradiating UV rays before applying the fourth voltage Vb2, and then the RM monomers may be completely hardened by irradiating the UV rays after applying the fourth voltage Vb2.

According to the current embodiment of the present invention, an aperture ratio of the pixel region P may be improved, and the viewing angle of the display device may be improved. Specifically, the liquid crystal molecules 310 of the liquid crystal layer 300 may be stably pre-tilted. Accordingly, reliability of manufacturing processes of the display device may be improved, and productivity of the display device may be improved by simplifying the manufacturing processes.

As described above, according to a display device and a method of manufacturing the display device of the present invention, the display device may have an improved viewing angle by applying a linear polarization structure.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A display device, comprising:
   a first substrate arrangement including a domain forming layer, a pixel electrode arranged on the domain forming layer, a bottom electrode arranged within a pixel region and a storage line in direct contact with an end of the bottom electrode, the pixel electrode having a cross type opening pattern;
   a second substrate arrangement including a common electrode arranged on an entire surface that faces the first substrate arrangement; and
   a liquid crystal layer arranged between the first substrate arrangement and the second substrate arrangement, the liquid crystal layer including a plurality of liquid crystal molecules and a reactive mesogen to fix liquid crystal molecules and to produce a liquid crystal domain based on the cross type opening pattern.

2. The display device of claim 1, wherein the bottom electrode is comprised of a transparent electrode material.

3. The display device of claim 2, wherein the bottom electrode is arranged at a location that corresponds to the cross type opening pattern in the pixel electrode.

4. The display device of claim 3, wherein a stronger electric field is applied to the liquid crystal molecules in a vicinity of the cross type opening pattern by applying a greater voltage to the bottom electrode than to the pixel electrode.

5. The display device of claim 1, wherein the first substrate arrangement further comprises a switching device that includes a contact electrode electrically connected to the pixel electrode, and the domain forming layer further comprises a contact hole to expose the contact electrode and to allow the pixel electrode to contact the contact electrode.

6. The display device of claim 1, wherein the display device comprises a plurality of pixel regions, wherein the cross type opening pattern is arranged to divide the pixel electrode in each pixel region into four equal parts by having the pixel electrode in each pixel region being patterned only by the cross type opening pattern.

7. The display device of claim 1, wherein the liquid crystal layer is arranged to face a center of the cross type opening pattern.

8. The display device of claim 1, wherein the liquid crystal layer is arranged to linearly polarize light emitted from the display device.

9. The display device of claim 1, the common electrode being arranged on an entire surface of the second substrate arrangement and being absent of any pattern.

10. The display device of claim 1, further comprising:
    a first alignment layer arranged on the pixel electrode of the first substrate arrangement; and
    a second alignment layer arranged on the common electrode of the second substrate arrangement, wherein each of the first and second alignment layers comprise a vertical alignment material.

11. The display device of claim 10, wherein the reactive mesogen is arranged only in portions of the liquid crystal layer that are adjacent to each of the first and second vertical alignment layers.

12. The display device of claim 1, the pixel electrode having a rectangular periphery for each pixel, the rectangular periphery having a pair of long sides opposite to each other and a pair of short sides opposite to each other, the cross type opening pattern being an opening in the pixel electrode having a first branch parallel to the two long sides and a second branch intersecting the first branch near a center of a rectangle formed by the rectangular periphery and being parallel to the short sides.

13. The display device of claim 12, the first branch extending to an edge of the pixel electrode at one of the short sides.

14. The display device of claim 12, wherein ends of second branch being spaced apart from corresponding ones of the long sides.

15. The display device of claim 12, the first branch extending to only one of the short sides.

16. The display device of claim 12, the opening further comprising a third branch parallel to and spaced apart from the second branch and being connected to one end of the first branch.

17. The display device of claim 1, the display device including a plurality of pixels, the pixel electrode having a rectangular shape and being perforated only by the cross type opening pattern.

18. The display device of claim 1, the display device including a plurality of pixels, the pixel electrode being present everywhere within a rectangular periphery within each pixel except for the cross type opening pattern, the cross type opening pattern being a single opening in the pattern of the pixel electrode.

19. The display device of claim 1, wherein a liquid crystal domain of the liquid crystal layer is formed according to changes in intensity of an electric field between the common electrode and the pixel electrode due to the cross type opening pattern in the pixel electrode only by having the common electrode being absent of any pattern.

* * * * *